United States Patent [19]

George et al.

[11] 4,061,516

[45] Dec. 6, 1977

[54] PATCHING TECHNIQUE FOR DAMAGED, PRINTED DESIGN

[75] Inventors: Jay R. George, Manheim; Larry L. Line; David H. Reed, both of Lancaster, all of Pa.

[73] Assignee: Armstrong Cork Company, Lancaster, Pa.

[21] Appl. No.: 729,473

[22] Filed: Oct. 4, 1976

[51] Int. Cl.$^2$ .................................................. B32B 35/00

[52] U.S. Cl. ........................................ 156/94; 156/230; 264/36; 427/140; 428/63

[58] Field of Search ................... 156/94, 230, 240, 383; 428/63; 427/140; 264/36

[56] References Cited

U.S. PATENT DOCUMENTS

| | | | |
|---|---|---|---|
| 1,161,711 | 11/1915 | McKerrow et al. | 427/148 |
| 2,649,876 | 8/1953 | Thompson et al. | 156/94 |
| 2,681,877 | 6/1954 | Seymour | 156/94 |
| 3,666,516 | 5/1972 | Dunning | 156/232 |
| 3,928,710 | 12/1975 | Arnold et al. | 156/240 |

FOREIGN PATENT DOCUMENTS

| | | | |
|---|---|---|---|
| 1,113,695 | 5/1968 | United Kingdom | 156/240 |

*Primary Examiner*—Edward G. Whitby

[57] ABSTRACT

A process is provided for repairing design defects or damage in a decorative surface. Repair patches are made at the same time that the decorative surface is prepared. Any defects in a decorative surface are corrected by a repair patch which has the same pattern as the decorative surface. The repair patch is specifically made so that it can be applied to the decorative surface to conceal defects in the decorative surface.

7 Claims, 1 Drawing Figure

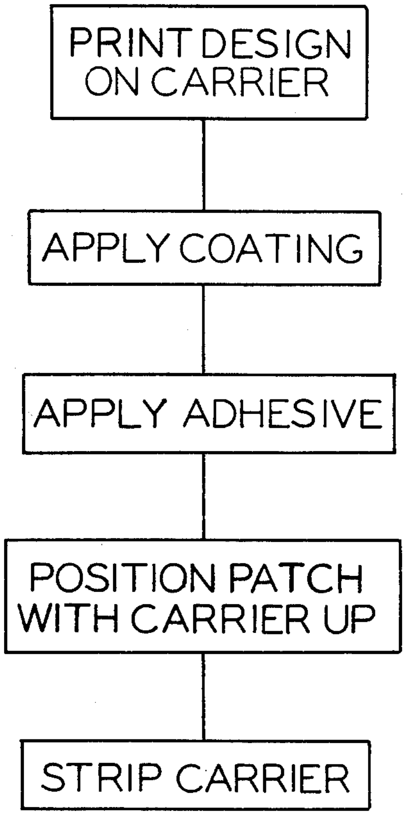
PRINT DESIGN ON CARRIER
APPLY COATING
APPLY ADHESIVE
POSITION PATCH WITH CARRIER UP
STRIP CARRIER

PATCHING TECHNIQUE FOR DAMAGED, PRINTED DESIGN

BACKGROUND OF THE INVENTION

1. Field of the Invention

The invention is directed to a repairing technique for decorative surfaces and, more particularly, to a technique for repairing printed wood grain patterns on furniture components.

2. Description of the Prior Art

U.S. Pat. No. 1,161,711 shows it is old for transferring designs onto wood. U.S. Pat. No. 3,666,516 is another example of a printed design on a transfer sheet. Said design may be subsequently applied to wood to provide it with a wood grain pattern.

SUMMARY OF THE INVENTION

The invention is directed to a process for repairing design defects in a decorative surface. A design compatible to the design on the decorative surface is printed on a carrier. Over this there is applied a substantially opaque coating, and over this opaque coating there is applied an adhesive layer. When a repair is to be carried out, the material printed on the carrier forms a patch and this is applied to cover up a defect on the decorative surface. Through the use of heat and pressure, the patch is adhered to the decorative surface and the carrier is removed from the patch. The repair patch is cut in generally a football shape which helps the patch to readily blend in with the design of the decorative surface. The invention is particularly useful for correcting defects in a wood grain design printed on the surface of a furniture component. The ease of application of the patch makes the invention herein a good cost saving technique for rapidly repairing damaged furniture, etc.

BRIEF DESCRIPTION OF THE DRAWING

The FIGURE is a block diagram of the inventive process.

DESCRIPTION OF THE PREFERRED EMBODIMENT

Damage to printed particle board surface on assembled or partly assembled furniture often occurs during the manufacture of furniture. This damage includes just abraded print or can include gouges in particle board. The gouges can be filled and smoothed to the original surface plane. The print having been destroyed, heretofore, has made it necessary either to laboriously attempt to hand paint a duplication of the print in the damaged area or to scrap the furniture component. Herein is disclosed a new process which has as its objective the repair of damaged case goods quickly and easily with a patch material. The process includes both the preparation of the patch material and its application to the damaged decorative surface.

Generally the process requires that a ½ mil transparent layer of mylar be temporarily adhered to a rigid carrier and this be run through the same offset gravure printer which is being used to print the particle board which will be assembled into the furniture component. The same printer set-up, gravure rolls and inks are used for preparing the patch material as used for printing the particle board. After the mylar has been printed with the design, a background coating is applied thereover and then an adhesive is applied over the background coating. This background coating may be opaque, clear, etc., depending upon the nature of the decorative surface to be repaired. Normally, football-shaped patches are cut from the mylar which has been stripped from the rigid carrier. This football-shaped patch is then applied to the damaged area with the adhesive surface down and printed design up. Through heat and pressure the patch adheres to the printed surface of the particle board. The mylar is peeled off, leaving the damaged area covered by a repair patch which design-wise blends in with the design printed on the particle board. Naturally, the football-shaped patch was cut from the mylar sheet at a point where the design of the patch would blend with the design at the damaged area of the particle board. Subsequent finish operations blend the patched area in with the printed particle board so that the patched area is not raised up above the printed particle board in the finished product. The finish coats are sufficiently thick enough that the very thin patch does not cause one to feel its presence on the finished surface of the furniture component.

Specifically, the process utilized to form the patch and mount it in position is as follows. A ½ mil thick piece of mylar is placed upon a particle board of the same thickness as the particle board being printed. Therefore, the patch material can be printed at the same time the particle board for the furniture component is being printed. Normally, the transparent mylar film is held on the particle board with tape at the edges of the film. The desired pattern is printed on the mylar film. Normally with furniture, this is a wood grain pattern, but the invention is not limited to patching printed designs for furniture and, therefore, the design can be any type. The important thing is that a design be printed on the mylar which design is compatible with the finished product design being printed so that there is available material which can be used for patching damaged surfaces of the finished product. The printed mylar film is then coated with a thermoplastic, pigmented base coat. A typical material that may be utilized is No. 343-N DURABAR base coat which is a tan pigment coating mixed in an acrylic binder and sold by Mobil Chemical Co. This base coat may be sprayed or otherwise applied to the printed mylar and permitted to dry by appropriate drying means. Overtop of the pigmented base coat there is sprayed a clear, thermoplastic acrylic lacquer adhesive such as Borden Krylon #1301 which is a clear acrylic lacquer adhesive put out by Borden Company. The mylar sheet can then be released from the carrier by simply releasing the taped edges of the myler film from the carrier. There is now available appropriate patching material for repairing any defects in the decorative surfaces of the material which is to be used for the finished product. Specifically, there is now available patching material with a wood grain design which can now be used to correct defects in the wood grain printed design on particle board that is used to form a finished furniture component.

Once it has been determined that there is a defect in the furniture component or some other printed surface, one must select an area of the patching material which will match or blend in with the damaged area of the part to be repaired. The selected area is cut from the patching material with a razor blade. The shape of the patch should resemble the silhouette of a football, that is, pointed at its ends and in a general oval shape. If a wood grain design has been printed on the patching material, best results are secured when the points of the patch are aligned with the grain of the wood grain pattern on the damaged item. The patch is laid over the damaged spot with the mylar film side up and the adhesive coating down against the damaged area. Adhesion of the patch is accomplished by the application of heat and pressure. A hot rubber roller, hand held, is normally used. The surface temperature of the roller should be about 350° F. and a pressure of about 1.6 pounds per linear inch is required. Moving the heated roller back and forth across the patch will adhere the patch to the particle board due to the presence of the acrylic adhesive. The mylar film may now be stripped off the patching material applied to the particle board. This is accomplished quite readily because mylar does not adhere well to most materials and, particularly, a base coating. At this point, if a finger were rubbed across the damaged area, one could feel the presence of the patch. When the furniture component is carried through the conventional manufacturing process which requires sanding and the applying of appropriate finish coats to the furniture component, the sensation of the presence of the patch is removed. This is a well-recognized phenomenon and is being utilized quite extensively today in the hobby art dealing with decoupage. The thickness of the finish coat is such that the presence of the patch is masked by the finish coat on the furniture product.

The drawing shows the steps of carrying out the process for forming the patch and placing the patch on the damaged decorative surface.

What is claimed is:

1. In a process for repairing printed design defects in a decorative surface, the steps comprising:

a. printing the decorative surface and printing a compatible design on a carrier with the same printing setup,
b. applying over the design on the carrier a background coating,
c. then applying over said last mentioned coating on the carrier an adhesive layer,
d. said carrier with said printing and coatings forming a repair patch,
e. positioning at least a part of said patch on the design defect in said decorative surface with said adhesive layer adjacent said decorative surface, and
f. stripping said carrier from said patch.

2. In a process according to claim 1 wherein said adhesive layer is a heat sensitive material and there is the further step of using heat and pressure to adhere the patch to the decorative surface.

3. In a process according to claim 1 wherein said patch positioned on the decorative surface has a design compatible with the design surrounding and including the defect and there is the further step of cutting the patch applied in generally a football shape.

4. In a process according to claim 3 wherein the design is a wood grain design and the long axis of the football shape patch extends along the grain of the wood grain design.

5. In a process according to claim 4 wherein said carrier is mounted on particle board and printed at the same time as is the particle board used to make the finished product.

6. In a process according to claim 5 wherein said finished decorative surface with the patch applied thereto is covered by conventional finish coating material to obscure the presence of the patch from detection by touch.

7. In a process according to claim 6 wherein said background coating is substantially opaque.

* * * * *